US006822954B2

(12) United States Patent
McConnell et al.

(10) Patent No.: US 6,822,954 B2
(45) Date of Patent: Nov. 23, 2004

(54) TELECOMMUNICATIONS GATEWAY

(75) Inventors: Richard McConnell, Belfast (GB); Denis Murphy, Belfast (GB)

(73) Assignee: Openwave Systems (ROI) Limited, Dublin (IE)

( * ) Notice: Subject to any disclaimer, the term of this patent is extended or adjusted under 35 U.S.C. 154(b) by 585 days.

(21) Appl. No.: 09/919,920

(22) Filed: Aug. 2, 2001

(65) Prior Publication Data

US 2002/0015403 A1 Feb. 7, 2002

Related U.S. Application Data

(63) Continuation of application No. PCT/IE00/00017, filed on Feb. 3, 2000.

(30) Foreign Application Priority Data

Feb. 4, 1999 (IE) .................................................. 990076

(51) Int. Cl.[7] ............................................ H04L 12/66
(52) U.S. Cl. ........................ 370/352; 370/357; 370/389; 370/401
(58) Field of Search ................................ 370/352, 349, 370/345, 389, 467, 465, 466, 338, 401, 354, 328, 357; 705/40, 44, 34; 455/433, 556, 426, 466, 435, 445

(56) References Cited

U.S. PATENT DOCUMENTS

| | | | | |
|---|---|---|---|---|
| 6,185,208 B1 | * | 2/2001 | Liao | ............................. 370/392 |
| 6,243,581 B1 | * | 6/2001 | Jawanda | .................... 455/432.2 |
| 6,317,831 B1 | * | 11/2001 | King | ............................ 713/171 |
| 6,377,982 B1 | * | 4/2002 | Rai et al. | ...................... 709/217 |
| 6,393,482 B1 | * | 5/2002 | Rai et al. | ...................... 709/225 |
| 6,400,722 B1 | * | 6/2002 | Chuah et al. | ................ 370/401 |
| 6,414,950 B1 | * | 7/2002 | Rai et al. | ...................... 370/338 |
| 6,421,714 B1 | * | 7/2002 | Rai et al. | ...................... 709/217 |
| 6,507,589 B1 | * | 1/2003 | Ramasubramani et al. | . 370/465 |
| 6,587,684 B1 | * | 7/2003 | Hsu et al. | ..................... 455/419 |
| 6,594,484 B1 | * | 7/2003 | Hitchings, Jr. | ............ 455/414.1 |
| 6,621,505 B1 | * | 9/2003 | Beauchamp et al. | ......... 345/764 |
| 6,721,288 B1 | * | 4/2004 | King et al. | .................. 370/310 |
| 2003/0055870 A1 | * | 3/2003 | Smethers | ..................... 709/203 |

FOREIGN PATENT DOCUMENTS

| | | |
|---|---|---|
| EP | 0700231 | 3/1996 |
| WO | WO 97/22209 | 6/1997 |

* cited by examiner

*Primary Examiner*—Wellington Chin
*Assistant Examiner*—Jamal A. Fox
(74) *Attorney, Agent, or Firm*—Blakely, Sokoloff, Taylor & Zafman LLP

(57) ABSTRACT

A gateway has a stack with a bearer adaptation layer and an HTTP client. The gateway may be connected by an HTTP link to an origin server and by a bearer interface to a mobile network. It may also be connected by an HTTP link to a WTA server. A context manager is a user on the stack and supports interfaces to allow access to external entities in a versatile manner. An event manager captures events including billing events and writes to an event log and to a billing log. A management entity provides overall control and sets configurations for the event manager.

44 Claims, 5 Drawing Sheets

TELECOMMUNICATIONS GATEWAY

This patent is a continuation of International Application no. PCT/IE00/00017, filed on Feb. 3, 2000 under the Patent Cooperation Treaty (PCT), which claims priority from Ireland application no. 990076, filed on Feb. 4, 1999.

INTRODUCTION

1. Field of the Invention

The invention relates to a gateway for telecommunication networks, and particularly for networks providing Wireless Application Protocol (WAP) capability.

2. Prior Art Discussion

In recent years, WAP specifications have been developed to govern the interoperability aspects of WAP functionality. These specify a stack having a bearer adaptation layer for interfacing with a bearer, and a client for interfacing with an origin server to obtain content.

At present, implementation of such functionality involves much adaptation of existing network nodes. Also, it is complex to add functionality for auxiliary services which add value for a network operator.

OBJECTS OF THE INVENTION

The invention is directed towards providing a gateway which may be easily connected in a network to allow a range of services to be provided in a versatile manner, and which is scaleable and modular.

SUMMARY OF THE INVENTION

According to the invention, there is provided a telecommunications gateway comprising a stack comprising a bearer adaptation layer for interfacing with a bearer, and a client for interfacing with an origin server, characterised in that the gateway further comprises a context manager acting as a user on the stack and supporting an interface means to an external entity to provide an auxiliary service.

This is a very flexible and versatile configuration as the context manager acts as a platform for features by virtue of being a user on the stack and having means for supporting an interface means.

In one embodiment, the interface means comprises an accounting server comprising means for accepting, storing and making available a mapping between a client telephone number and the IP address allocated by the network.

Preferably, the accounting server comprises means for interfacing with an external accounting client for receiving the mapping information.

In a still further embodiment, the gateway further comprises a database, and the accounting server comprises means for storing the mapping data in the database.

Preferably, the accounting server comprises means for interfacing according to the RADIUS accounting protocol.

In one embodiment, the interface means comprises a lightweight directory access protocol (LDAP) client comprising means for accessing an external system to retrieve subscriber data.

In one embodiment, the LDAP client comprises means for using mapping associations managed by the accounting server to identify subscribers.

In one embodiment, the context manager comprises means for controlling access to content.

In a further embodiment, the context manager comprises means for determining access criteria from an external system via the LDAP client.

In another embodiment, the context manager comprises means for accessing a stored URL whitelist, a URL blacklist, and a URL greylist of URLs which are accessed only under set conditions.

In a further embodiment, the context manager comprises means for retrieving the condition via the LDAP client.

Preferably, the whitelist, the blacklist, and the greylist are stored in an internal database.

In another embodiment, the context manager comprises means for determining class of service values for subscribers.

Preferably, the context manager comprises means for determining URL class of service values and comparing subscriber and URL class of service values to control access.

In one embodiment, the context manager comprises means for using a hashing algorithm process for searching said lists.

In another manager, the context manager comprises means for inferring from the lists an indication of whether the telephone number should be transferred to the origin server, and for implementing the transfer via the origin server client.

Preferably, the interface means comprises a push API comprising means for allowing an external entity to pass push requests to the context manager.

In one embodiment, the context manager comprises means for receiving a URL in a push request and for subsequently retrieving the content identified by the URL, and for pushing the content to the client via the stack.

In a further embodiment, the context manager comprises means for receiving a push request with content and for pushing the content to a client via the stack.

Preferably, the interface means comprises an encoder for converting text WML to byte code format and, a compiler for converting WMLscript to byte code format.

In another embodiment, the gateway further comprises an event manager linked to the stack, and to the context manager and the stack comprises means for sending events to the event manager.

In one embodiment, the stack and the context manager comprise means for identifying events in messages in either direction.

In a further embodiment, events are identified by processing code.

In one embodiment, the event manager comprises means for accepting events and logging them.

In a further embodiment, the event manager comprises means for providing TCP/IP connections with the context manager and the stack for receiving events.

In one embodiment, the event manager comprises means for receiving the events in a Tag Length Value (TLV) format.

In one embodiment, the event manager comprises means for maintaining an event log and a billing log, and means for logging billing events to the billing log.

Preferably, the event manager comprises means for accessing event classification data from an internal database.

In one embodiment, the event manager comprises means for making the classification data available to the stack and to the context manager.

In another embodiment, the event manager comprises means for controlling threads of queues for communication of classification data.

In one embodiment, the gateway further comprises a management entity linked to the context manager, the stack, and the event manager for gateway management purposes.

In another embodiment, the management entity comprises means for providing a management GUI interface.

In a further embodiment, the management entity comprises means for setting event classifications for the event manager.

In another embodiment, the management entity comprises means for setting control data in an internal database for the context manager, the stack, and the event manager.

In one embodiment, the management entity comprises means for controlling start up, shut down, and re-start via message queues.

In a further embodiment, the management entity comprises means for setting event conditions as alarms, and the event manager comprises means for automatically notifying the management entity of alarms.

According to a further aspect, the invention provides a method for providing access to an external entity by a telecommunications network, the method comprising the steps of:

providing a gateway having a stack comprising a bearer adaptation layer, providing a context manager acting as a user on a stack, and the context manager supporting an interface which accesses the external entity.

In one embodiment, the context manager supports a plurality of interfaces.

In one embodiment, an interface is an accounting server which accepts, stores, and makes available a mapping between a client telephone number and the IP address allocated by the network.

In one embodiment, an interface is a lightweight directory access protocol client which accesses an external system to retrieve subscriber data.

In another embodiment, the method comprises the further step of the context manager controlling access to content according to URL and subscriber class of service values.

In one embodiment, the method comprises the further step of the context manager inferring from a whitelist, a blacklist, and a greylist an indication of whether a telephone number should be transferred to an origin server, and implementing the transfer via an origin server client.

In one embodiment, the method comprises the further step of the stack automatically sending events to an event manager, and the event manager maintaining an event log and a billing log.

In one embodiment, the event manager sets event conditions in a configurable basis.

DETAILED DESCRIPTION OF THE INVENTION

BRIEF DESCRIPTION OF THE DRAWINGS

The invention will be more clearly understood from the following description of some embodiments thereof, given by way of example only with reference to the accompanying drawings in which.

DESCRIPTION OF THE EMBODIMENTS

Figure 1:
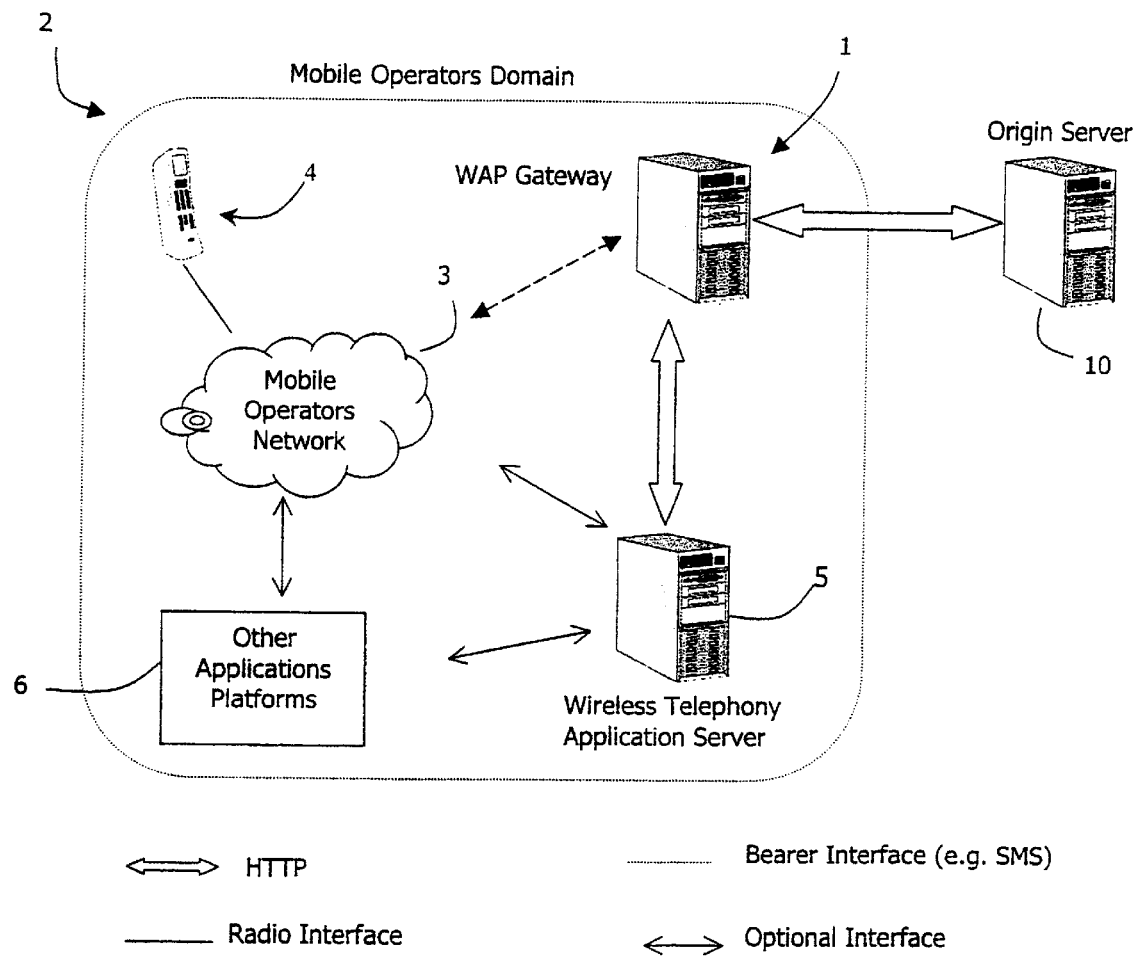
FIG. 1 is a schematic overview showing a manner in which a gateway of the invention may be deployed in a network.

Referring to FIG. 1, a WAP gateway 1 is connected in a mobile operator's domain 2. It has a bearer link with a mobile operator's network 3 for handsets (clients) 4. The gateway 1 is also connected by a HTTP link to a wireless telephony application (WTA) server 5. The domain 2 also comprises other application platforms 6 connected by radio interfaces. The gateway 1 is also connected by a HTTP link to an origin server 10. This is a typical deployment, however, only the links to the network 3 and to the origin server 10 are essential.

The gateway 1 allows WAP capable handsets (i.e. those equipped with a browser and a WAP stack) to access applications hosted on standard HTTP servers based in the mobile operator's domain 2 and elsewhere (for example, service providers).

The gateway 1 comprises a WAP Stack, which implements the WAP protocol itself. The stack communicates with a corresponding WAP stack on the handset 4 to allow the content to be requested and downloaded from the appropriate server. The gateway 1 also comprises an HTTP 1.1 client which allows content to be retrieved from the relevant origin servers. Origin servers are used to host the content and applications to be served to the handset. They are capable of serving HTML and JavaScript, but for WAP Services serve WML and WMLScript. All content on the origin servers is located using standard URLs and so there is effectively no limit on the number of origin servers that can be accessed provided that they serve compatible content. Origin servers may be located within the mobile operator's domain, within an ISP, or on the Internet. In general, the location of the origin server is determined by the nature of the content or applications which it serves. For example, if an operator wishes to provide access to a banking application for WAP subscribers the origin server is likely to be located at the bank's premises, where it can be closely controlled. The interface between the origin server 10 and the gateway 1 is HTTP 1.1. This means that the origin server does not need to be aware that it is serving WML/WMLScript, that it is communicating with a WAP Gateway, or that the client is a handset 4 communicating over a WAP-enabled mobile network 3.

Since the handset 4 is also a telephone, WAP specifies a series of extensions to allow integration of normal mobile network services with WAP Services. These extensions are known as Wireless Telephony Application (WTA) Services. Typical examples of WTA services are voice call setup and call accept, and access to phone book information on the handset. A typical application would be where an incoming call is received at the handset, the browser displays details of the caller having first compared the number with the entries in the handset phonebook, and offers choices such as accepting the call, rejecting the call, or diverting to voicemail. WTA services are constructed in WML and WMLScript.

The WTA Server has a number of functions as follows.

WTA Repository

In order for WTA services on the phone to operate to a guaranteed level of performance, the immediate content required for those services must be stored on the phone. However this content is maintained on the WTA Server by the operator and downloaded to the phone at appropriate points. For example, it can be pushed to the phone by the WTA Server 5.

WTA Content Storage

The WTA Server provides access to content for WTA applications in the same way that the origin server 10 provides access to normal content and applications. For example, the WTA Server 5 might host an application which accesses prepaid billing information within an operator's IN network.

Integration with Existing Networks

A key objective is that WAP services should be capable of interacting with an operator's existing network infrastructure, for example, an intelligent network (IN). Therefore, the WTA Server can contain functionality to provide this interface, for example, an INAP or MAP interface to the SS7 network.

Figure 2:
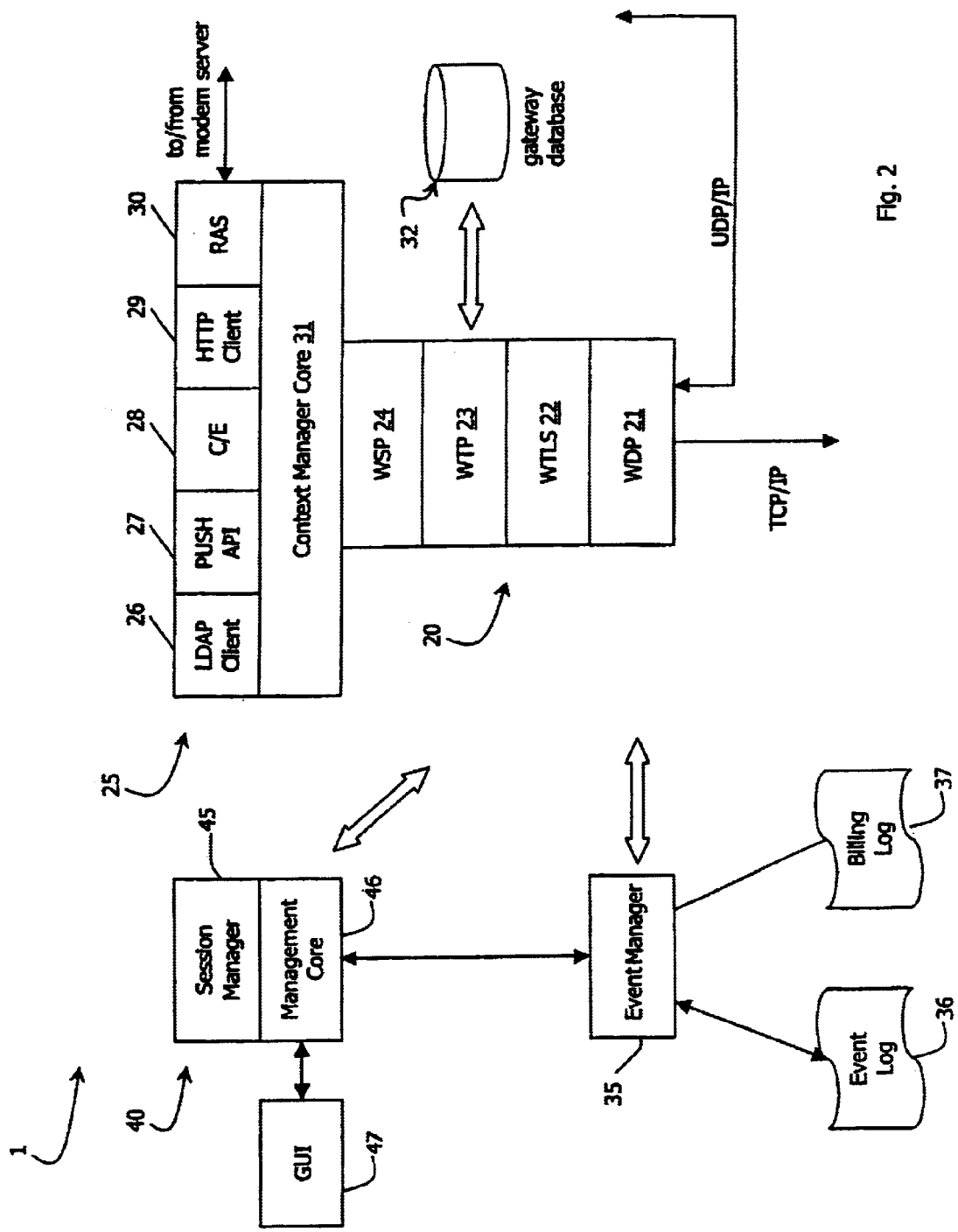
FIG. 2 is a diagram showing the architecture of the gateway.

Referring to FIG. 2, the gateway 1 comprises a stack 20 comprising in sequence form the lowermost layer,

- a wireless datagram protocol (WDP) layer 21,
- a wireless transport layer security (WTLS) layer 22,
- a wireless transaction protocol (WTP) layer 23, and
- a wireless session protocol (WSP) layer 24.

A context manager 25 is a user on the stack 22 and supports interfaces to external entities. The following are the interfaces in this embodiment.

- a lightweight directory access protocol (LDAP) client 26,
- a push API 27,
- a compiler/encoder (C/E) 28,
- a HTTP client 29, and
- a RADIUS accounting server 30.

The context manager 25 also comprises an executable core 31 which is a user on the stack 20, and more particularly the WSP layer 24. The core 31 supports the interfaces 26 to 30.

The gateway 1 also comprises an internal database 32 which is accessed by most major components of the gateway.

In addition, the gateway 1 also comprises an event manager 35 which maintains an event log 36 and a billing log 37 and which interacts with all of the layers of the stack and with the context manager 25. The event manager 35 is connected to a management entity 40 comprising a session manager 45 and core executable 46. A management GUI 47 is provided for the management entity.

The architecture is open, modular, and scaleable. Each major component (including each layer of the stack 20) comprises a separate multi-threaded Unix process. Communication between processes is through TCP/IP sockets which can be configured to allow traffic throughput to be increased as required. The processes can be distributed across hardware platforms to provide optimum redundancy and/or to maximise performance.

The WDP layer 21 interfaces with the bearer side and provides a TCP/IP interface supporting SMPP and UCP (EMI) protocols, and it also allows UDP/IP communication with a WAP client.

On the Internet side, the HTTP client 29 communicates with the origin server 10 for download of WAP/WTA (Wireless Telephony Application) applications and content.

The management GUI 47 controls the gateway by allowing such tasks as Stop/Start of the gateway, monitoring gateway processes, restarting after failures, updating configuration data, and monitoring alarms. Much of this control is achieved by appropriate writes to the database 32.

Each layer of the stack 20 provides a service to one or more upper layer of the stack or, in the case of the context manager 25, to an external push initiator via the push API 27. The context manager 25 provides the service and is therefore known as the Service Provider, while the push initiator uses the service and is known as the Service User. Each layer provides a Service Access Point (SAP) to enable communication between the different layers of the gateway. The SAPs allow service users to connect to the layer and to access the service provided.

Figure 3:
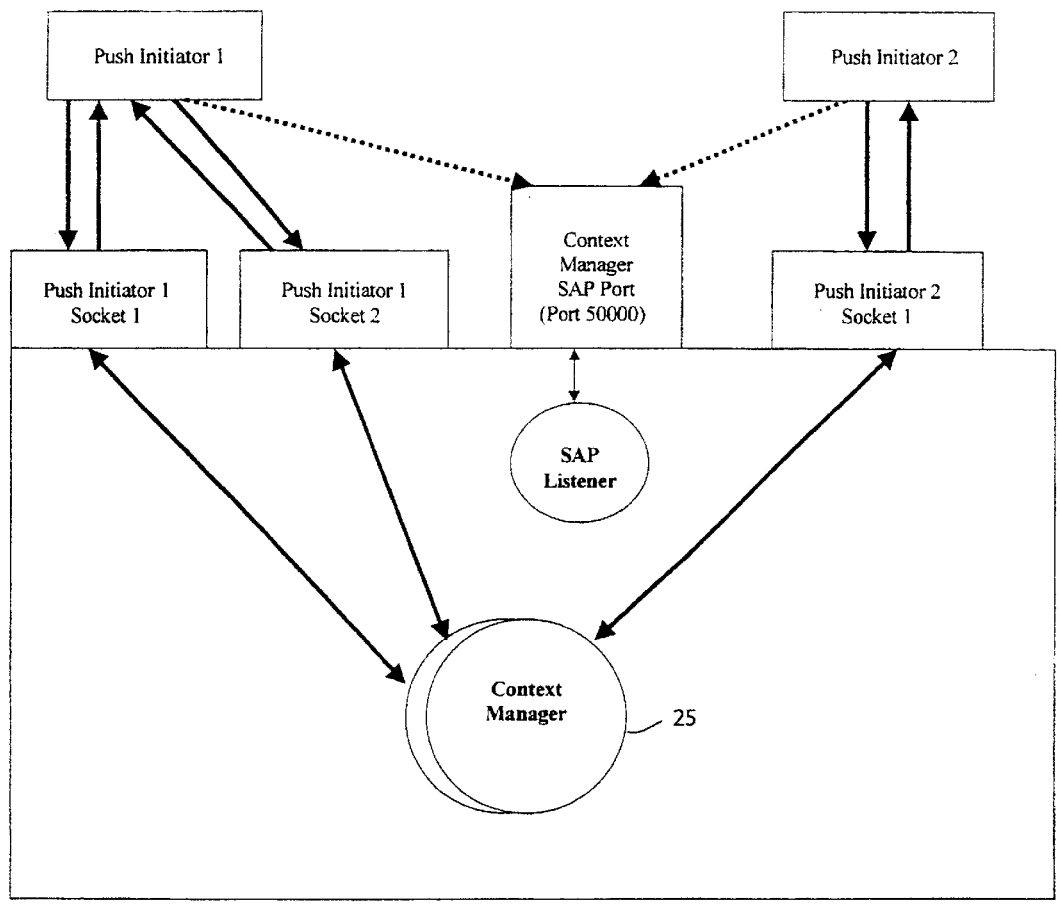
FIG. 3 is a diagram showing layer interfacing.

FIG. 3 illustrates the SAP interface using as an example a SAP provided by the context manager 25 to external push initiator applications. The operation of the SAP interface is the same for all layers; only the service primitives differ.

1. The context manager (CM) 25 creates a single SAP TCP socket and binds it to a configurable SAP port. There is only one SAP port for the CM 25 for use by all push initiators. The CM 25 creates a single listener, which listens on the SAP socket for incoming connections from push initiators. In FIG. 3, two push applications have already connected to the CM SAP, Push Initiator 1 and Push Initiator 2.

2. The push initiator must know the port number of the SAP for the service provider. For example, in FIG. 3 Push Initiator 1 and Push Initiator 2 must know that the port number for the CM SAP is 50000.

3. The push initiator connects to the SAP port and the connection is accepted by the listener. The socket on which the connection is established is different from the socket on which the listener is listening. A separate port within the CM 25 now deals with control of the connection to the push initiator and the listener returns to listening for new connections from push initiators.

4. The CM 25 now waits for authentication by the service user. The service user authenticates itself by sending a Logon service primitive. The Service User ID and Password provided by the push initiator are compared with values held in configuration data for the CM SAP. If the values do not match, authentication has failed; the socket is simply closed and an event/alarm is logged.

If the push initiator is authenticated successfully, the CM 25 examines the configuration data to determine whether the maximum number of simultaneous connections has been exceeded for this push initiator. For example, in FIG. 3, Push Initiator 1 has two connections to the CM 25. The CM's configuration data for Push Initiator 1 defines the maximum number of simultaneous connections that Push Initiator 1 can make to the CM. Therefore, if the maximum number of connections for Push Initiator 1 was defined to be 2, any subsequent connection attempts by Push Initiator 1 would be rejected.

5. The CM 25 returns a Logon_Resp service primitive to the service user to indicate successful authentication. The primitive has only one field, Status. If the maximum number of simultaneous connections has been reached for the service user, the Status value will be set to the relevant Status code. The socket will be closed once the Logon_Resp is sent.

If authentication is successful and the maximum number of simultaneous connections has not been exceeded, a Logon_Resp with a positive Status is returned and exchange of service primitives between the push initiator and the CM 25 can begin.

The following defines the generic format of the messages (service primitives) exchanged between a service user (e.g. push initiator) and a service provider SAP (e.g. context manager 25). The service primitives provided for the Push Interface conform to the Tag-Length-Value TLV format and are defined below. All service primitives exchanged between a service user and a service provider via a SAP use a generic message format. Each service primitive is made up of a series of TLV elements and each TLV element is made up of three mandatory fields, in the following order:

TAG_ID

This is a unique identifier for the element, i.e. the Tag.

The TAG ID field is always 2 octets.

LENGTH

The length of the Value field in Octets, i.e. the Length.

The LENGTH field is of variable size and encoded according to the "extension bit" mechanism.

VALUE

Figure 4A:
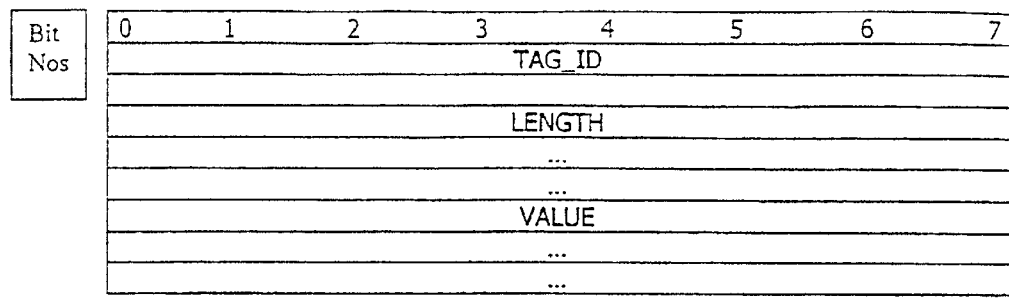
FIGS. 4(a) and 4(b) are diagrams illustrating service primitive formats.

The value associated with the element, i.e. the Value. The number of octets in the Value field is defined by the LENGTH field. The structure of a TLV is shown in FIG. 4(a).

The "extension bit" mechanism allows a series of octets to be grouped together to make up a single LENGTH field. The LENGTH field is a maximum of 5 octets long and when decoded can represent an imposed maximum of 32 bits. The "extension bit" mechanism uses bit 0 (the most significant bit) of each octet of the field to signify whether or not an octet is the last octet in the field. This means that only the lower 7 bits are used as data out of each octet.

The rule is as follows:

Bit 0=1, then one or more octets follow.
Bit 0=0, then this is the last octet.
An example of the encoding follows:

| Bit: 0 | 7 |
|---|---|
| 10000001 | |
| 11100001 | |
| 00000010 | |

An examination of bit 0 reveals that there are 3 octets in the field. The actual value then is the combination of the lower 7 bits in each octet, these are

| 1100001 | 0000010 |
|---|---|

These give a total decimal value of 28802.

Figure 4B:
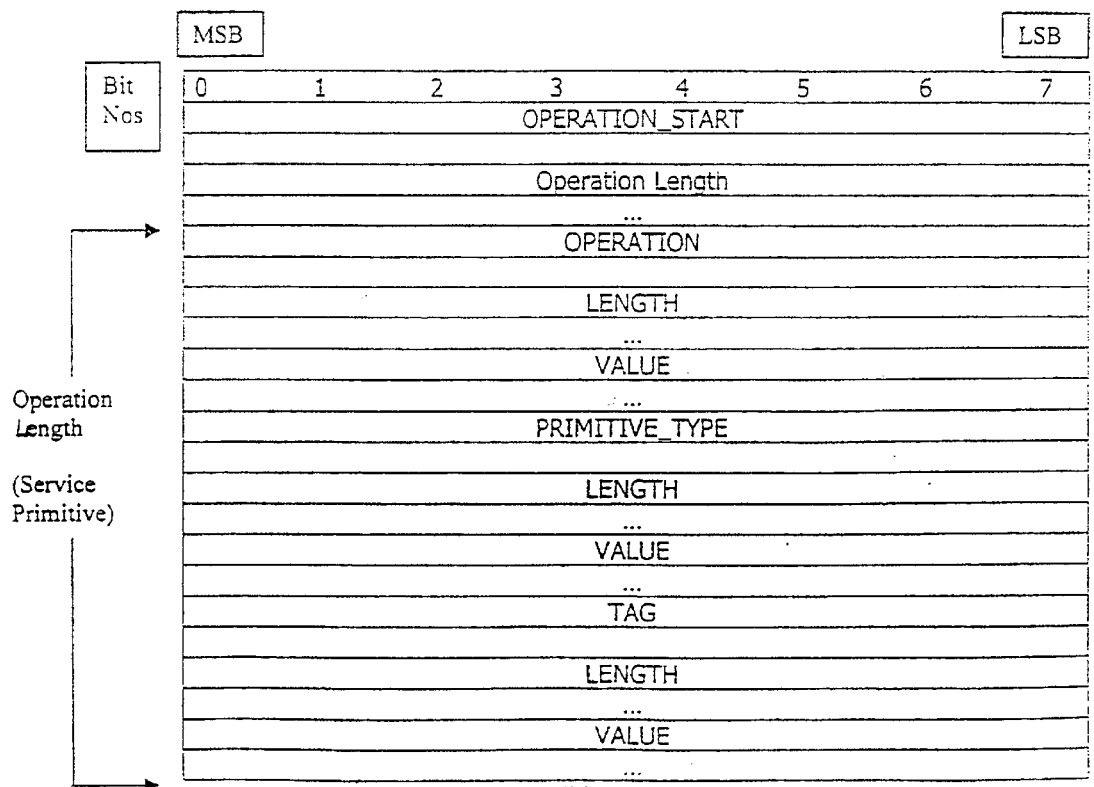

The format of a service primitive message, i.e. a message passed to/from a SAP, is illustrated in FIG. 4(b). All messages must begin with an OPERATION_START tag and an operation length. As shown in FIG. 4(b), Operation Length defines the length of the data remaining within the message, i.e. the service primitive itself. The integrity of the message can be verified by comparing the operation length with the total length of the component fields of the service primitive. The second field of the message must always be OPERATION. This field identifies the service primitive being used, e.g. Logon, WAP-Push, etc. The remainder of the fields are the content of the service primitive itself and can be any set of valid TLVs in any order.

The table below illustrates the raw TLV stream for an S-Disconnect.req sent from the CM 25 to the WSP layer 24. The values of string fields such as ERROR_BODY have been left as ASCII text to aid clarity. Each octet of the TLV value would contain the binary representation of each ASCII character. In the example the Length only requires a single octet. However, the length may be up to 5 octets using the extension-bit mechanism.

| Field | Value | Octet Numbers |
|---|---|---|
| OPERATION_START | 0 × 0000 | 1–2 |
| Operation_Length | 0 × 35 | 3 |
| OPERATION | 0 × 0001 | 4–5 |
| Length | 0 × 01 | 6 |
| Value (S-Disconnect) | 0 × 05 | 7 |
| PRIMITIVE_SUFFIX | 0 × 0002 | 8–9 |
| Length | 0 × 01 | 10 |
| Value (Req) | 0 × 00 | 11 |
| REASON_CODE | 0 × 000E | 12–13 |
| Length | 0 × 01 | 14 |
| Value (401 - Assigned number 0 × 41) | 0 × 41 | 15 |
| ERROR_HEADERS | 0 × 000F | 16–17 |
| Length | 0 × 07 | 18 |
| Value ("EXAMPLE") | EXAMPLE | 19–25 |
| ERROR_BODY | 0 × 0010 | 26–27 |
| Length | 0 × 15 | 28 |
| Value ("Access Not Authorised") | Access Not Authorised | 29–49 |
| SERVER_TRANSACTION_ID | 0 × 0016 | 50–51 |
| Length | 0 × 04 | 52 |
| Value | 0 × 12131415 | 53–56 |

The following describes the layers 21 to 24 in more detail.

21. Wireless Datagram Protocol (WDP)

The communications mechanism to transport data between the gateway 1 and the handset 4 is referred to as a bearer such as Short Message Service (SMS) or Circuit-Switched Data (CSD) connection. Different mobile bearers exhibit very different bandwidth and latency characteristics. For example, SMS messages are limited to 140 bytes. The WDP layer performs all necessary bearer adaptation, i.e. adapting the data for transmission across or following receipt from the chosen bearer. In general, adaptation involves breaking up the data into fragments of an appropriate size for the bearer and interfacing with the bearer network to transport the data. For example, for GSM SMS adaptation involves fragmenting the data into segments of 140 bytes and sending this data in short messages (SM) to the handset. The WDP layer on the handset reconstructs the data from the received SMs and presents it to the higher layers of the WAP stack. Since all adaptation is carried out by the WDP layer, the higher layers of the WAP Stack do not need any knowledge of the bearer. This allows the higher layers of the WAP stack, and applications and browsers, to remain independent of both the mobile network and the bearer. The gateway 1 supports SMS over SMPP V3.3 or UCP as a bearer as well as CSD over UDP/IP.

22. Wireless Transport Layer Security (WTLS)

The WTLS layer provides privacy, data integrity and authentication between two communicating applications. Data is compressed and encrypted before being sent over WDP, and is decompressed and decrypted when received from WDP.

23. Wireless Transaction Protocol (WTP)

WTP is a lightweight transaction oriented protocol designed to run on top of a datagram service (i.e. WDP). it provides retransmission and acknowledgement services, relieving the upper layers of these tasks.

24. Wireless Session Protocol (WSP)

The WSP layer provides session services to the WAP application layer, allowing the exchange of requests and responses. This layer provides two services as follows:

The Connection-Mode service allows a reliable session to be established between a client and the gateway 1 over which content can be requested and delivered. The client and the gateway 1 can negotiate a mutually acceptable set of capabilities, for example, maximum SDU size. The service also allows the session to be suspended, and resumed on another bearer if required.

The Connectionless Mode service provides an unreliable session service between the client and the gateway 1.

Connection-Mode service requires details of each session to be recorded both in dynamic memory inside the WSP Layer, and in persistent storage (within the database 32). Session related information will change during the lifetime of the session and it is the responsibility of the WSP layer 24 to update the persistent storage medium accordingly (for example when a session is suspended, resumed, disconnected etc).

In addition, the WSP layer 24 provides a Push capability allowing an application to send information to the handset without the handset first requesting the information. A typical Push application might be where a subscriber is alerted when a stock value goes outside certain boundaries. An Unconfirmed Push (unreliable) is provided by the Connectionless service, while the Connection-Mode service provides both Confirmed and Unconfirmed Push within an established session.

The context manager 25 is configured as a user to the WSP layer 24, sending and receiving WAP format messages to interface with important network nodes. The context manager 25 accepts URL requests from the WSP layer 24 and passes these to the HTTP client 29 which retrieves the associated WAP content either directly from cache (for frequently accessed URL's) or from the origin server 10 using HTTP 1.1 protocol over TCP/IP. If the request is serviceable, the origin server 10 responds with the requested content. Thus, the HTTP client for interfacing with the origin server 10 is an interface supported by the context manager 25.

The interfaces 26, 27, 28, and 30 communicate with various external entities to provide auxiliary services.

The LDAP interface 26 communicates with a subscriber information repository This information remains resident on the network operator's existing subscriber database and may be accessed during a WAP session using the subscriber telephone number (MSISDN), in order to authenticate the WAP client (subscriber) and possibly to retrieve information such as "subscriber associated class of service values", which may then be used within the gateway 1 to control the services (URLs) which a user is authorised to access. LDAP is an open, standard protocol specified by the IETF which means that the gateway 1 can easily interface to subscriber data systems which support LDAP. In addition, the gateway 1 can be tailored to interface to subscriber data systems which do not support LDAP.

The gateway 1 authenticates the user initiating the WAP session by sending a query containing the subscriber's MSISDN (obtained from the bearer), from the context manager 25 to an (external) customer subscriber database via LDAP, in order to verify that the subscriber in question has been provisioned for WAP service. It is possible to query the subscriber database over this interface using the clients' MSISDN and co request information related to that client/(subscriber). For example, is the subscriber WAP provisioned for this network Yes/No? It "Yes" then provide information on "class of service " (COS) values associated with subscriber. Subscriber class of service values (returned) will then be stored as part of the subscriber's WAP session information within the gateway.

Subscriber and URL "class of service" values are used by a context manager 25 URL whitelist/greylist/blacklist function. In this embodiment, the function is implemented as follows. The lists are stored in the database 32. The function is accessed each time a subscriber makes a URL request through the gateway. The URL being requested is first compared against those listed in the URL Blacklist (predefined by the operator). If the URL is matched then the request is refused. Next, the URL whitelist/greylist is accessed. If the URL is not matched then access is refused. If the URL is matched and has an open class of service value, then all subscribers will be allowed access. If the URL is matched and has a class of service value other than open, it will first be necessary to determine whether the user requesting the information has a matching class of service value (COS values already retrieved from external database and saved within the gateway) before allowing access to the particular service. This is termed a "greylisted" URL. For example, a premium rate URL service may have an associated class value of "1". Subscribers wishing to access this service must at least have an associated class of service value of "1", i.e. the user must subscribe to this type of service before gaining access. The user may have other associated class of service values, for example, class "2" may indicate entertainment services. URLs appearing in the black list are barred to all users. The URL lists may be updated by the operator from the GUI 47 and the updates are written to the database 32.

It is also possible, using this function, to specify on a per-URL basis, whether the client's MSISDN is passed on to the origin server 10 as part of the HTTP request.

This is useful for WAP services who wish to identify the client before sending a personalised response back to the handset.

Implementation of the list searches involves use of a combination of indexes, hashing algorithms, and arrays to achieve good efficiency. The following is the main process.

Convert hostname to lower case

Convert all "% HEX HEX" encodings in the filename to their ASCII equivalent

Remove script data contained in URI i.e. text after "?"

Hash the filename to obtain an array index

Access the filename index at the component number given in the previous step, and read the address contained there Access the memory address from the previous step (this will point to the host name index)

Hash the host name to obtain an array index

Access the host name index at the component number given in the previous step, and read the address contained there Access the memory address from the previous step (this will point to an array of URI structures)

Perform a linear search on the URI structures array until host/filename combination found or end of array reached If not found, search list of URI structures containing wildcards If found check "Allowable" field to determine if HTTP request should be made or denied The following sets out the linear search process.

```
while ( still nodes in list AND not found)
begin
    filename = address of last char in filename
    set found to false
    set host found to false
    set filename found to false
```

-continued

```
set port found to false
while ( *filename == *(structure→filename) AND still characters
to test)
begin
  decrement filename pointer
  decrement structure→filename pointer
end while
if scanned all of filename then set filename found to true
if (filename found is true) then
  while ( *host == *(structure→host) AND still characters to test)
  begin
    increment host pointer
    increment structure→host pointer
  end while
  if scanned all of host then
    set host found to true
  end if
  if (host found is true) then
    if ( port == structure→port)
      set port found to true
    end if
  end if
end if
if filename found and host found and port found then
  read allowable field
  set found to true
else
  move to next node in list
end if
end while
The following sets out the wildcard search.
while (still nodes in list and not found)
begin
  move to next node in list
  while (filename not found AND still characters to test)
  begin
    if ( *(structure→filename) == '*' )
    begin
      read next character in structure→filename after '*'
      if no more characters after '*' then
      set filenamefound to true
      else
        skip characters in filename until char after '*' in structure→file-
          name found
        if char not found then break out of while
      endif
    end if
    if (*filename == *(structure→filename) ) then
      increment filename pointer
      increment structure→filename pointer
      decrement chars to test
    else
      break out of while
  end while
end while
```

A dedicated provisioning server for WAP subscribers may be provided in the gateway 1, rather than integrating the gateway with an existing subscriber database in their network. This involves a dedicated LDAP server which contains a database for persistent storage of WAP subscriber data, a provisioning interface (which can handle bulk provisioning) and an LDAP interface towards the gateway 1.

The 'PUSH' API 27, allows an application to bind on to the gateway 1 to send unsolicited information to the client. The PUSH API 27 provides three options to the operator:

Push of WML/WMLScript content to the handset (will require use of the compiler/encoder 28 prior to being transferred to the handset).

Push of binary WAP content (compiled/encoded WMLScript/WML content) and all other content types defined by the WAP Forum to the handset.

Push of URL (in which case the HTTP client 29 will source the WAP content from the location on the origin server indicated by the URL and download the content to the handset).

Both connectionless and connection-orientated PUSH are supported. The PUSH API 27 also provides a means by which WAP and WTA applications may bind on to the gateway.

To establish a connection to the gateway 1 over CSD (Circuit Switched Data), a WAP device must firstly connect to a modem server. The modem server dynamically allocates an IP address for the WAP device and this IP address is then used within all UDP/IP datagrams in all communications with the gateway 1. In order for the gateway 1 to determine which WAP subscriber is making a call, it has a mechanism of mapping the IP address to the MSISDN provided by the Radius Accounting Server (RAS) 30.

Figure 5:
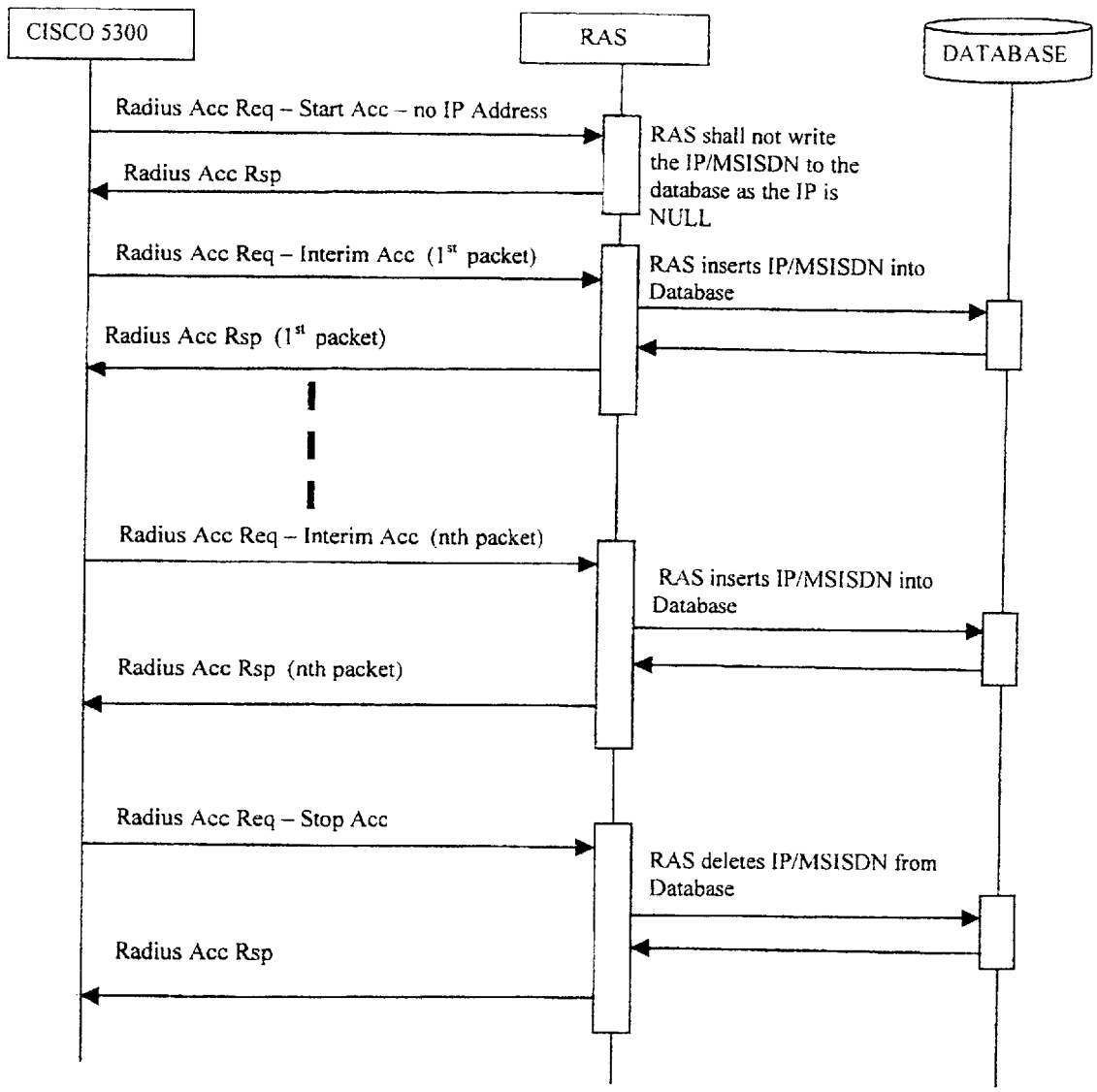
FIG. 5 is a diagram showing accounting operations.

The (external) modem server operates as a client of the RAS 30. The client is responsible for sending user accounting information, as specified in the RADIUS RFC2139 specification, to the RAS 30. The RAS 30 is responsible for receiving the accounting request and returning a response to the client indicating that it has successfully received the request. On call set up, the modem server sends a Radius Accounting Message to the RAS 30, indicating start accounting for the IP/MSISDN pair. The RAS 30 then inserts the IP/MSISDN pair into the database 32 where it may be accessed by the context manager 25. The context manager 25 may append this MSISDN onto the URL query, thus providing the origin server 10 with knowledge of which subscriber is making the query. When the RAS 30 has successfully handled an accounting request it will return a response to the client indicating it has successfully received the request. On call shutdown, the modem server sends a RAS Accounting Stop Message to the RAS 30, indicating stop accounting for the IP/MSISDN pair. The RAS 30 deletes the IP/MSISDN pair from the database 32 and sends a response to the modem server. The following sets out the RAS 30 interfaces within an operator's network, as illustrated in FIG. 5.

1. To establish a connection to the gateway 1, a WAP device firstly connects to a modem server. The modem server dynamically allocates an IP address for the WAP device and this IP address is then used within UDP/IP datagrams in all communications with the gateway 1. Internally in the gateway 1, this IP address must be translated into an MSISDN for the purposes of subscriber management.
2. The (external) Radius Authentication Server authenticates the message.
3. The RAS 30 receives and processes the Radius Accounting Messages received from the modem server.
4. The RAS 30 inserts the IP/MSISDN pair into the database 32 on an accounting start and deletes the IP/MSISDN from the database on an accounting stop.
5. A Get is received by the gateway 1.
6. In order to determine which subscriber has invoked the Get, the context manager 25 retrieves the MSISDN from the database 32 using the IP address.

The sequence need not involve a modem server, as in the case with GPRS, and may use any service supporting RADIUS accounting.

Regarding the compiler/encoder 28, some content types defined by WAP have a compact binary format suitable for efficient over-the-air transmission. The interface 28 converts such content types from text to binary format. For example, if the response body from the origin server is text WML, it is passed to the Encoder for conversion to bytecode (binary format). Similarly, if the response body is text WMLscript, it is passed to the Compiler for conversion to bytecode. In addition, the standard text HTTP headers have an equivalent compact binary format defined by WAP. The compiler/ encoder 28 also transcodes the content provider's character set to the mobile clients preferred character set. The context manager 25 does not interfere with any content which is not specified by the WAP Forum (i.e it will allow it to pass through without alteration). The response is subsequently passed to the WSP layer 24 for transmission to the client.

Referring again to FIG. 1, events are set throughout the gateway 1 as a request/response transaction is processed.

The classification of an event is decided by the event manager 35, and is not known to the calling component. In this way, a particular event may be reclassified (for example, to be billable) by a change to the event manager event table only. The event manager 35 collects the events recorded by the stack 20, for example, SMS received, URL decoded, or access to origin server refused. The type of the event may be classified as:

Information

Critical

Alarm

Error

Events sent to the event manager conform to the TLV format described above.

All events are written by the event manager 35 to the event log 36. in the case where an event of classification "Alarm" is received, the event manger 35 also notifies an alarm panel on the gateway management GUI 47. Events marked for billing are written also to the separate billing log 37. The following is an example of event table layout in the event manager (configurable by the operator from the management system GUI 47).

| Event | Event Class | Event Level | Billing Yes/No | Text Information |
|---|---|---|---|---|
| 1 | 0 (error) | 1–255 | No | |
| 2 | 1 (information) | 1–255 | Yes | |
| 3 | 1 | 1–255 | No | |
| 4 | 2 (alarm) | 1–255 | No | |

All of the event information such as event classes is defined as configuration data and loaded into a table by the EM during initialisation. This table is accessed by the EM worker threads to determine where an event is to be output, billing file or event file, and what information is to be output.

An event table is defined as an array of pointers to the structures below. The Event ID is used as an index to the array, while the structure pointed to by each array element defines the data for the corresponding event.

Since ranges of event IDs are allocated to a component, some array elements will point to NULL. In this situation, it is assumed that the event is invalid. The following in an example.

```
typedef struct event_array_t
{
    UCH  uchEvent_level;          /* The event level */
    EventClass_t enumEvent_class; /* The event class eg. alarm.
                                     error, info */
    UCH  uchEvent_billable;       /* Whether the event is
                                     billable (Y or N) */
    US   usEventTextLen;          /* Length of the event text */
    UCH  *puchEventText;          /* Message text to be output */
} EventArray_t;
```

A read/write lock is defined for the event table. A read lock must be obtained in order to read from the table. A write lock must be obtained in order to initialise or update the table. The lock is defined as follows

```
pthread_rwlock_t EM_ET_Lock;
The pthread_rwlock_t type is defined as follows
typedef struct{
    pthread_mutex_t rw_mutex;       /* Access lock for structure
                                       */
    pthread_cond_t  rw_condreaders; /* Condition variable for
                                       waiting readers */
    pthread_cond_t  rw_condwriters; /* Condition variable for
                                       waiting writers */
    int  rw_magic;                  /* Indicates that structure is
                                       initialised */
    int  rw_nwaitreaders;           /* Number of waiting readers */
    int  rw_nwaitwriters;           /* Number of waiting writers */
    int  rw_refcount;               /* -1 if writer else number of readers */
} pthread_rwlock_t;
```

The pthread_rwlock_t definition is provided for information purposes only. Access to and manipulation of read/write locks is achieved through a set of APIs provided by the RWlock module.

Since multiple threads may wish to write to the event log and billing files at the same time, a mutex is required for each file. A thread must lock the mutex for the relevant file before writing to the file. A data structure is defined as follows

```
typedef struct log_file_t
{
    pthread_mutex_t mutexFileLock;  /* Protects the file */
    FILE*           pfileLogFile;   /* The log file to be written */
} LogFile_t;
```

Separate instances of this structure must be defined for the event log and the billing file. If on writing to the file, a thread discovers that the file has exceeded its maximum size, the thread will close the file, rename and compress it, and reopen a new file updating the pfileLogFile pointer. It will then unlock the mutex.

The event manager 35 may add additional information (such as a textual description) to the received events before writing them to permanent storage (in the event log or billing log). Events related to a request/response sequence through the gateway are linked together by a unique Event Linkage ID. This can be used when analysing the event log, to trace all events related to a particular WAP request/response transaction. This is useful when performing traffic analysis or general troubleshooting. The Event Linkage ID is also useful for associating billing events related to a particular WAP request/response transaction together in the billing log.

It should be noted that events need not be reported to the event manager 35. This will allow the operator to ensure that only events which are deemed useful are reported to the event manager 35 and onward to the event log 36. Each event recorded within a stack process has an associated "event level" (configurable) in the range of 1–255. There is an overall event "threshold level" (also configurable). If an event has an associated event level which is lower than the overall event level, then the event is reported to the event manager 35. These configuration levels are set within the event manager 35 and are accessed using the threads described above.

The event log 36 can be read using a typical Unix editor such as VI Editor™ and can be searched with standard Unix utilities. The procedure involves reading the event log at least on a daily basis in order to detect and resolve non-critical gateway errors.

Events may be processed to analyse them and determine actions to be undertaken in response to conditions detected in this manner. The structure controlled by the event manager 35 provides an excellent basis for such analysis and action triggering. The following is a table of WDP events.

| Event ID | Event Text | Description |
|---|---|---|
| 1 | WDP has started successfully | The WDP Layer has been successfully started up. |
| 2 | WDP Bearer Queue congested | The bearer queue is full of datagrams waiting to be transmitted over the bearer. The size of the bearer queue is configurable and may be too small. This event can also be caused be the operation of the SMSC slowing down due to congestion and is not responding as normal to the WDP layer requests to transmit datagrams. Possible Action: Check the traffic levels on the SMSC to determine the cause of this event. If the traffic levels are normal and there is no congestion then check that the size of the bearer is not too small. |
| 3 | WDP Common Reassembly Area congested | The Reassembly area in the WDP layer where the datagrams are stored until all Short Message fragments have been received, and where they are then reassembled, is fully congested. Possible Action: The size of the Reassembly area in terms of the maximum number of datagrams it can contain is configurable. Check that this value is not too small. |
| 4 | WDP Bearer Queue 75% congested | The bearer queue is 75% full of datagrams waiting to be transmitted over the bearer. The size of the bearer queue is configurable and may be too small This event can also be caused be the operation of the SMSC slowing down due to congestion and is not responding as normal to the WDP layer requests to transmit datagrams. |
| 5 | WDP Common Reassembly Area 75% congested | The Reassembly area in the WDP layer where the datagrams are stored until all Short Message fragments have been received, and where they are then reassembled, is 75% full. |
| 6 | WDP Bearer Queue 90% congested | The bearer queue is 90% full of datagrams waiting to be transmitted over the bearer. The size of the bearer queue is configurable and may be too small This event can also be caused be the operation of the SMSC slowing down due to congestion and is not responding as normal to the WDP layer requests to transmit datagrams. Possible Action: Check the traffic levels on the SMSC to determine the cause of this event. If the traffic levels are normal and there is no congestion then check that the size of the bearer is not too small. |

The following is a table of context manager events.

| Event ID | Event Text | Description |
|---|---|---|
| 3002 | CM capabilities Invalid | Negotiable capabilities received in a Service Primitive could not be decoded. Default capabilities will be used. |
| 3003 | CM matching confirm job found | For a connection-orientated transaction, confirmation has been received from the client following reception of content. |
| 3004 | CM No Matching Confirm Job Found | For a connection-orientated transaction, CM has timed out waiting for a confirmation of reception of content from the handset or has received a confirmation message from WSP but no matching job has been located for the message. If this event is occurring frequently then it may indicate a network problem or corruption in the WSP layer. Action: Contact Support Services if the problem persists. |
| 3005 | CM Compilation Failed | The compiler has failed to compile WML content into binary format. The WML is invalid. |
| 3006 | CM Congested 75% | The layer is 75% busy. This is an information Message only. |
| 3007 | CM Congested 90% | The layer is very busy due to a high level of traffic. Action: If this event occurs frequently then call Support Services. It may be possible to alleviate the problem in the short term by increasing the number of worker threads for the layer but it is advisable not to adjust the configuration data until the Support Engineer has been consulted. |

The gateway 1 does not produce Call Detail Records (CDRs). Instead, it produces Toll Tickets for each WAP request/response transactions and makes these TT's available to a mediation platform for post processing where WAP related CDRs are produced.

The gateway 1 gathers extensive billing data for each WAP request/response transaction, for example download of content, made by a subscriber, URLs visited, or time taken for download of content. This billing data is stored in the billing log 37 and made available to the operator's billing system. To facilitate interaction with disparate billing systems, billing data is stored in the billing log 37 in a generic and flexible format (in Tag-Length-Value (TLV) format).

The billing log 37 contains events sent from the event manager 35 which are classified as "billable events". All billable events related to a particular request/response transaction through the GW are linked using a unique Event Linkage ID. The operator can decide which events should be stored for billing purposes (it is a configurable entity within the event manager 35). When the billing log reaches a size threshold (configurable) or when a time period threshold (also configurable) has been reached it is closed and normally archived within the gateway 1. The operator will periodically poll the gateway for archived billing logs, in which case the logs will be transferred to the operator billing mediation platform for post processing.

The data can be presented to the operator's billing system in a format which that system can easily accept. This flexibility allows an operator to introduce and bill for new services easily without having to make changes to their existing billing system.

Session information is maintained by the WSP layer 24. The session manager 45 provides a mechanism to obtain information on a particular session or alter its behaviour (for example, disconnect the session). It is possible to gain access to the session manager 45 from the management system GUI 47 and to view ongoing WAP sessions. Session information related to active WAP sessions are cached within the gateway 1 (in memory). This avoids the need to retrieve session information from the database 32 each time it is required. The size of this cache is a configurable entity. The cache is periodically flushed (frequency is also a configurable entity) to remove information related to sessions which have not been in use for some time. Session information related to WAP sessions that make requests for download of content infrequently, should reside only on a database.

More generally, the management entity (ME) 40 is responsible for the management of all key processes within the gateway 1. The ME 40 is itself a process, and provides a TCP/IP interface towards the (JAVA based) GUI 47 to allow the operator to request management operations. The main functionality provided by the ME 40 is as follows.

Startup/Shutdown of Gateway 1

Startup/Shutdown of Individual Processes

Monitoring/restart of Processes

The ME 40 continually monitors all of the processes for which it is responsible. If a process fails the ME 40 will automatically restart it.

Access to/update of Configuration Data

The ME 40 allows the operator to manage the configuration data for the WAP Gateway. The ME 40 also allows the operator to signal the affected processes to reload configuration data once it has been modified.

Management of Ongoing WAP Sessions Within the Gateway 1.

This includes analysis of active suspended sessions, and disconnection of specific sessions without affecting other sessions or overall service.

Defining Levels of Trace

The ME 40 allows the operator to modify the level of trace information produced by each process. This is typically used for troubleshooting and support.

Output of Statistics

Each process which implements a layer of the stack gathers statistics (counters) for the activity on its interfaces, for example, the WDP layer 21 would keep counters for the number of SMs sent/received on each link to an SMSC. Each process will be signalled at regular intervals, for example, hourly, to output its counters to a database, after which the process will reset the counters. The ME 40 will accumulate these statistics from the database at regular intervals, for example, daily, to form a statistical view of the traffic within the system.

Monitoring of Critical Alarms

The event manager 35 reports critical alarms to the ME 40. The GUI 47 contains an alarm panel for displaying critical alarms to the Operator.

The gateway 1 is highly configurable and each gateway process contains an extensive list of configurable parameters which may be altered from the gateway management system GUI 47. This provides the operator with the ability to fine tune the gateway 1 to suit their particular performance requirements. Each configurable parameter has a default value and an associated value range. The initialisation parameters (default values) for the gateway are held in persistent storage (database 32) and read on system start-up by each process.

What is claimed is:

1. A telecommunications gateway comprising a stack (20) comprising a bearer adaptation layer for interfacing with a bearer, and a client for interfacing with an origin server, characterised in that, the gateway further comprises a context manager (25) acting as a user on the stack (20) and supporting an interface means (26, 27, 28, 30) to an external entity to provide an auxiliary service.

2. A telecommunications gateway as claimed in claim 1, wherein the interface means comprises an accounting server comprising means for accepting, storing and making available a mapping between a client telephone number and the IP address allocated by the network.

3. A telecommunications gateway as claimed in claim 2, wherein the accounting server comprises means for interfacing with an external accounting client for receiving the mapping information.

4. A telecommunications gateway as claimed in claim 2, wherein the gateway further comprises a database, and the accounting server comprises means for storing the mapping data in the database.

5. A telecommunications gateway as claimed in claim 2, wherein the accounting server comprises means for interfacing according to the RADIUS accounting protocol.

6. A telecommunications gateway as claimed in claim 1, wherein the interface means comprises a lightweight directory access protocol (LDAP) client comprising means for accessing an external system to retrieve subscriber data.

7. A telecommunications gateway as claimed in claim 1, wherein the interface means comprises a lightweight directory access protocol (LDAP) client comprising means for accessing an external system to retrieve subscriber data, and wherein the LDAP client comprises means for using mapping associations managed by the accounting server to identify subscribers.

8. A telecommunications gateway as claimed in claim 1, wherein the context manager comprises means for controlling access to content.

9. A telecommunications gateway as claimed in claim 1, wherein the context manager comprises means for determining access criteria from an external system via the LDAP client.

10. A telecommunications gateway as claimed in claim 1, wherein the context manager comprises means for controlling access to content, and wherein said access means comprises means for accessing a stored URL whitelist, a URL blacklist, and a URL greylist of URLs which are accessed only under set conditions.

11. A telecommunications gateway as claimed in claim 10, wherein the context manager comprises means for retrieving the condition via the LDAP client.

12. A telecommunications gateway as claimed in claim 10, wherein the whitelist, the blacklist, and the greylist are stored in an internal database.

13. A telecommunications gateway as claimed in claim 1, wherein the context manager comprises means for controlling access to content, and wherein the context manager comprises means for determining class of service values for subscribers.

14. A telecommunications gateway as claimed in claim 13, wherein the context manager comprises means for determining URL class of service values and for comparing subscriber and URL class of service values to control access.

15. A telecommunications gateway as claimed in claim 10, wherein the context manager comprises means for using a hashing algorithm process for searching said lists.

16. A telecommunications gateway as claimed in claim 10, wherein the context manager comprises means for inferring from the lists an indication of whether the telephone number should be transferred to the origin server, and for implementing the transfer via the origin server client.

17. A telecommunications gateway as claimed in claim 1, wherein the interface means comprises a push API (27) comprising means for allowing an external entity to pass push requests to the context manager.

18. A telecommunications gateway as claimed in claim 17, wherein the context manager (25) comprises means for receiving a URL in a push request and for subsequently retrieving the content identified by the URL, and for pushing the content to the client via the stack (20).

19. A telecommunications gateway as claimed in claim 17, wherein the context manager (25) comprises means for receiving a push request with content and for pushing the content to a client via the stack (20).

20. A telecommunications gateway as claimed in claim 1, wherein the interface means comprises an encoder for converting text WML to byte code format and a compiler (28) for converting WMLscript to byte code format.

21. A telecommunications gateway as claimed in claim 1, wherein the gateway further comprises an event manager (35) linked to the stack and to the context manager (25), and the stack (20) comprises means for sending events to the event manager.

22. A telecommunications gateway as claimed in claim 1, wherein the gateway further comprises an event manager (35) linked to the stack and to the context manager (25), the stack (20) comprises means for sending events to the event manager, and the stack (20) and the context manager (25) comprise means for identifying events in messages in either direction.

23. A telecommunications gateway as claimed in claim 22, wherein events are identified by processing code.

24. A telecommunications gateway as claimed in claim 1, wherein the gateway further comprises an event manager (35) linked to the stack and to the context manager (25), and the stack (20) comprises means for sending events to the event manager, and wherein the event manager (35) comprises means for accepting events and logging them.

25. A telecommunications gateway as claimed in claim 24, wherein the event manager (35) comprises means for accepting events and logging them, and wherein the event manager (35) comprises means for providing TCP/IP connections with the context manager (25) and the stack (20) for receiving events.

26. A telecommunications gateway as claimed in claim 1, wherein the gateway further comprises an event manager (35) linked to the stack and to the context manager (25), and the stack (20) comprises means for sending events to the event manager, and wherein the event manager (35) comprises means for receiving the events in a Tag Length Value (TLV) format.

27. A telecommunications gateway as claimed in claim 1, wherein the gateway further comprises an event manager (35) linked to the stack and to the context manager (25), and the stack (20) comprises means for sending events to the event manager, and wherein the event manager (35) comprises means for maintaining an event log (36) and a billing log (37), and means for logging billing events to the billing log.

28. A telecommunications gateway as claimed in claim 1, wherein the gateway further comprises an event manager (35) linked to the stack and to the context manager (25), and the stack (20) comprises means for sending events to the event manager, and wherein the event manager (35) comprises means for maintaining an event log (36) and a billing log (37), and means for logging billing events to the billing log, and wherein the event manager (35) comprises means for accessing event classification data from an internal database (32).

29. A telecommunications gateway as claimed in claim 28, wherein the event manager comprises means for making the classification data available to the stack and to the context manager.

30. A telecommunications gateway as claimed in claim 28, wherein the event manager comprises means for making the classification data available to the stack and to the context manager, and wherein the event manager comprises means for making the classification data available to the stack and to the context manager, and wherein the event manager comprises means for controlling threads of queues for communication of classification data.

31. A telecommunications gateway as claimed in claim 1, wherein the gateway further comprises a management entity (40) linked to the context manager (25), to the stack (20), and to the event manager (35) for gateway management purposes.

32. A telecommunications gateway as claimed in claim 31, wherein the management entity (40) comprises means for providing a management GUI interface (47).

33. A telecommunications gateway as claimed in claim 31, wherein the management entity (40) comprises means for setting event classifications for the event manager (35).

34. A telecommunications gateway as claimed claim 31, wherein the management entity (40) comprises means for setting control data in an internal database (32) for the context manager (35), the stack (21), and the event manager (35).

35. A telecommunications gateway as claimed in claim 31, wherein the management entity (40) comprises means for controlling start up, shut down, and re-start via message queues.

36. A telecommunications gateway as claimed in claim 31, wherein the management entity (40) comprises means for setting event conditions as alarms, and the event manager comprises means for automatically notifying the management entity (40) of alarms.

37. A method for providing access to an external entity by a telecommunications network, the method comprising the steps of:

providing a gateway having a stack comprising a bearer adaptation layer, providing a context manager acting as a user on a stack, and the context manager supporting an interface which accesses the external entity.

38. A method as claimed in claim 37, wherein the context manager supports a plurality of interfaces.

39. A method as claimed in claim 38, wherein an interface is an accounting server which accepts, stores, and makes available a mapping between a client telephone number and the IP address allocated by the network.

40. A method as claimed in claim 37, wherein an interface is a lightweight directory access protocol client which accesses an external system to retrieve subscriber data.

41. A method as claimed in claim 37, comprising the further step of the context manager controlling access to content according to URL and subscriber class of service values.

42. A method as claimed in claim 37, comprising the further step of the context manager inferring from a whitelist, a blacklist, and a greylist an indication of whether a telephone number should be transferred to an origin server, and implementing the transfer via an origin server client.

43. A method as claimed in claim 37, comprising the further step of the stack automatically sending events to an event manager, and the event manager maintaining an event log and a billing log.

44. A method as claimed in claim 43, wherein the event manager sets event conditions in a configurable basis.

* * * * *

UNITED STATES PATENT AND TRADEMARK OFFICE
CERTIFICATE OF CORRECTION

PATENT NO. : 6,822,954 B2
DATED : November 23, 2004
INVENTOR(S) : Richard McConnell and Denis Murphy It is certified that error appears in the above-identified patent and that said Letters Patent is hereby corrected as shown below:

<u>Column 17,</u>
Line 64, remove "the" and replace with -- an --.
Line 65, remove "the" and replace with -- a --.

Signed and Sealed this

Seventeenth Day of May, 2005

JON W. DUDAS
*Director of the United States Patent and Trademark Office*